US010295009B2

(12) United States Patent
Leonard et al.

(10) Patent No.: US 10,295,009 B2
(45) Date of Patent: May 21, 2019

(54) MOUNTING ASSEMBLIES AND SYSTEMS INCLUDING SAME

(71) Applicant: Firestone Industrial Products Company, LLC, Indianapolis, IN (US)

(72) Inventors: Joshua R. Leonard, Noblesville, IN (US); Pradipta N. Moulik, Carmel, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 15/024,017

(22) PCT Filed: Oct. 10, 2014

(86) PCT No.: PCT/US2014/060186
§ 371 (c)(1),
(2) Date: Mar. 22, 2016

(87) PCT Pub. No.: WO2015/054673
PCT Pub. Date: Apr. 16, 2015

(65) Prior Publication Data
US 2016/0245363 A1    Aug. 25, 2016

Related U.S. Application Data

(60) Provisional application No. 61/889,361, filed on Oct. 10, 2013.

(51) Int. Cl.
*F16F 13/00* (2006.01)
*F16F 13/20* (2006.01)
*F16F 3/10* (2006.01)

(52) U.S. Cl.
CPC ............ *F16F 13/002* (2013.01); *F16F 3/10* (2013.01); *F16F 13/20* (2013.01); *F16F 2228/063* (2013.01)

(58) Field of Classification Search
CPC .. F16F 13/002; F16F 3/10; F16F 13/20; F16F 2228/063; F16F 2228/06; F16F 3/00; F16F 13/06; F16F 15/08
See application file for complete search history.

(56) References Cited

U.S. PATENT DOCUMENTS 5,833,204 A * 11/1998 Platus ..................... F16F 3/026
                                                       248/619
6,129,185 A * 10/2000 Osterberg ................. F16F 6/00
                                                       188/267.2

(Continued)

FOREIGN PATENT DOCUMENTS

DE            4011367            10/1991

OTHER PUBLICATIONS

International Search Report and Written Opinion for corresponding PCT application No. PCT/US2014/060186 dated Feb. 26, 2015.

*Primary Examiner* — Melanie Torres Williams
(74) *Attorney, Agent, or Firm* — Brian D. McAlhaney; Fay Sharpe LLP

(57) ABSTRACT

A mounting assembly (200) includes first and second mounting components (108, 112) that are displaceable relative to one another. At least one positive-stiffness biasing element (236) exhibiting a positive-stiffness spring rate is operatively disposed between the first and second mounting components. At least one negative-stiffness biasing (288, 290) element exhibiting a negative-stiffness spring rate is disposed between the first and second mounting components in parallel with the at least one positive-stiffness biasing element. A combined spring rate of the at least one positive-stiffness biasing element and the at least one negative-stiffness biasing element is less than the positive-stiffness spring rate of the at least one positive-stiffness biasing element alone. The mounting assembly can exhibit a natural frequency that is less than a natural frequency of a mounting assembly having the at least one positive-stiffness biasing element without the at least one negative-stiffness biasing element. Systems including such mounting assemblies are also included.

18 Claims, 15 Drawing Sheets

(56) References Cited

U.S. PATENT DOCUMENTS

| | | | |
|---|---|---|---|
| 7,000,907 B2* | 2/2006 | Achenbach | B60G 15/065 |
| | | | 188/317 |
| 2003/0155882 A1 | 8/2003 | Ono | |
| 2007/0052946 A1* | 3/2007 | Heiland | F16F 15/0275 |
| | | | 355/76 |
| 2010/0053589 A1* | 3/2010 | Hashemi | F16F 15/06 |
| | | | 355/77 |

* cited by examiner

MOUNTING ASSEMBLIES AND SYSTEMS INCLUDING SAME

BACKGROUND

The subject matter of the present disclosure broadly relates to the art of support structures and, more particularly, to mounting assemblies that are operative to support static and dynamic loads while damping and/or isolating vibrations between the supporting and supported structures between which the mounting assemblies are disposed.

It will be appreciated that the subject matter of the present disclosure is capable of broad application and use in connection with a variety of applications and/or environments in which static and/or dynamic loads associated with a supported structure are transferred or otherwise communicated to a supporting structure. Non-limiting examples of environments in which mounting assemblies in accordance with the subject matter of the present disclosure are suitable for use can include light-duty (e.g., automotive) and heavy-duty (e.g., tractor and/or trailer) motor vehicle applications, industrial machinery and equipment applications, agricultural and farm machinery applications, marine power and drive applications, aeronautical applications, and/or power generation (e.g., wind turbine, gas turbine and electrical generator) applications.

In known support structures, a supported structure or component can generate or otherwise be associated with static and dynamic loads. Typically, such loads are transmitted or otherwise communicated to the corresponding supporting structure or component. Mounting assemblies having conventional constructions of a wide variety of types, kinds, configurations and arrangements have been developed for use in transmitting or otherwise communicating the static and dynamic loads to, from and/or otherwise between the supported and supporting structures.

In many cases, conventional mounting assemblies provide a substantially-rigid interconnection between the supported and supporting structures. In such cases, one or more mounting assemblies are often fixedly attached to the supporting structure and pivotally attached to the supported structure. While such constructions may provide some degree of rotational freedom, such constructions are typically substantially fixed in the radial and/or axial directions.

However, in cases in which vibrations and/or other undesirable inputs are generated by or otherwise communicated to, from and/or between the supported and supporting structures, known mounting assemblies of the foregoing construction tend to directly transmit or otherwise communicate such vibrations and/or other undesirable inputs to, from and/or between the supported and supporting structures. As a result, mounting assemblies have been developed that provide a robust interconnection between the supported and supporting structures while also providing some amount of vibration damping and/or isolation. However, such designs are often deemed to provide effective damping over only a limited range of frequencies of vibration. In other cases, the transmission of undesirable vibrations could potentially be reduced through the use of a less rigid or otherwise more-compliant connection between the supported and supporting structures. However, mounting assemblies are typically sized or otherwise designed to withstand static and dynamic loads within a particular load range and to maintain the desired level of performance at least within those load ranges. In many cases, reducing the rigidity or otherwise increasing the compliance of the mounting assemblies can result in a decrease in performance (e.g., increased deflection) and/or other disadvantageous issues.

Notwithstanding the widespread usage and overall success of the wide variety of mounting assemblies that are known in the art, it is believed that a need exists to meet the foregoing and/or other competing goals while still providing comparable or improved performance, ease of manufacture, ease of assembly, ease of installation and/or reduced cost of manufacture.

BRIEF SUMMARY

One example of a mounting assembly in accordance with the subject matter of the present disclosure can include a base and a mounting element that are operatively associated with one another and dimensioned for securement between associated supported and supporting structures. The base and the mounting element can together at least partially define a chamber configured to receive a quantity of pressurized gas to thereby form a positive-stiffness biasing element. At least one biasing element capable of exhibiting a negative stiffness can be operatively connected between the base and mounting element in parallel with the positive-stiffness biasing element.

Another example of a mounting assembly in accordance with the subject matter of the present disclosure can include an inner mounting element and outer mounting element that are disposed in approximately coaxial and coextensive relation to one another. One or more positive-stiffness biasing elements can be operatively connected between the inner and outer mounting elements. At least one biasing element capable of exhibiting a negative stiffness can be operatively connected between the inner and outer mounting elements and in parallel with the positive-stiffness biasing element.

A further example of a mounting assembly in accordance with the subject matter of the present disclosure can be dimensioned for operative securement between an associated supporting component and an associated supported component. The mounting assembly can include a first mounting element and a second mounting element that is displaceable in at least one direction relative to the first mounting element. At least one positive-stiffness biasing element can be operatively disposed between the first and second mounting elements and can exhibit a positive-stiffness spring rate. At least one negative-stiffness biasing element can be operatively disposed between the first and second mounting elements and can exhibit a negative-stiffness spring rate. The at least one negative-stiffness biasing element can be operatively disposed in parallel with the at least one positive-stiffness biasing element such that a combined spring rate of the at least one positive-stiffness biasing element and the at least one negative-stiffness biasing element is less than the positive-stiffness spring rate of the at least one positive-stiffness biasing element alone.

Still a further example of a mounting assembly in accordance with the subject matter of the present disclosure can be dimensioned for operative securement between an associated supporting component and an associated supported component. The mounting assembly can include a first mounting element and a second mounting element that is displaceable in at least one direction relative to the first mounting element. At least one positive-stiffness biasing element can be operatively disposed between the first and second mounting elements and can exhibit a positive-stiffness spring rate. At least one negative-stiffness biasing element can be operatively disposed between the first and second mounting elements and can exhibit a negative-stiffness spring rate. The at least one negative-stiffness biasing element being operatively disposed in parallel with the at least one positive-stiffness biasing element such that the mounting assembly exhibits a natural frequency that is less than a natural frequency of a mounting assembly having the at least one positive-stiffness biasing element without the at least one negative-stiffness biasing element.

One example of a system in accordance with the subject matter of the present disclosure can include a supporting structure, a supported structure and one or more mounting assemblies according to any one of the foregoing paragraphs operatively connected therebetween.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
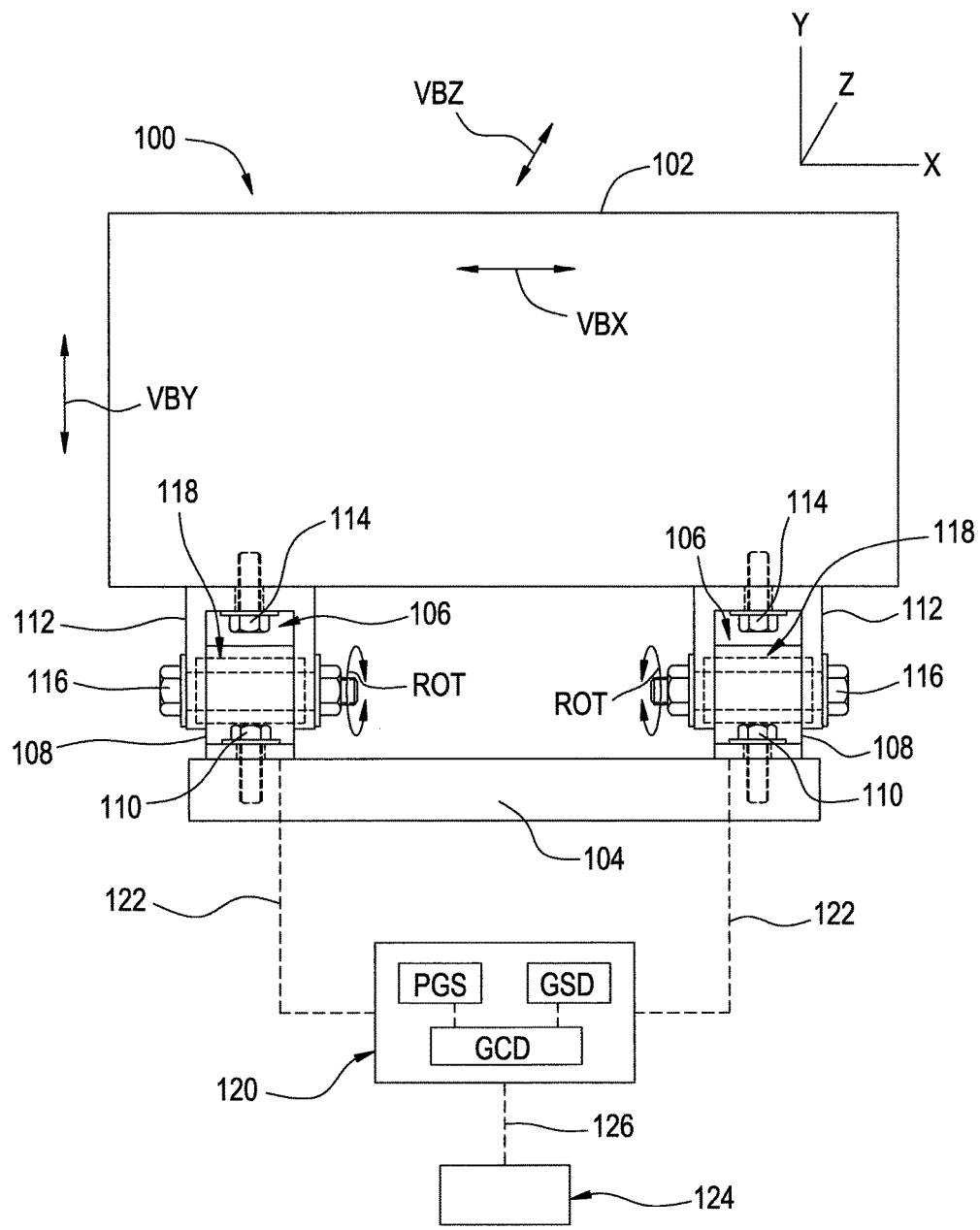
FIG. 1 is schematic representation of a system including a supported structure, a supporting structure and a plurality of mounting assemblies in accordance with the subject matter of the present disclosure.
Figure 2:
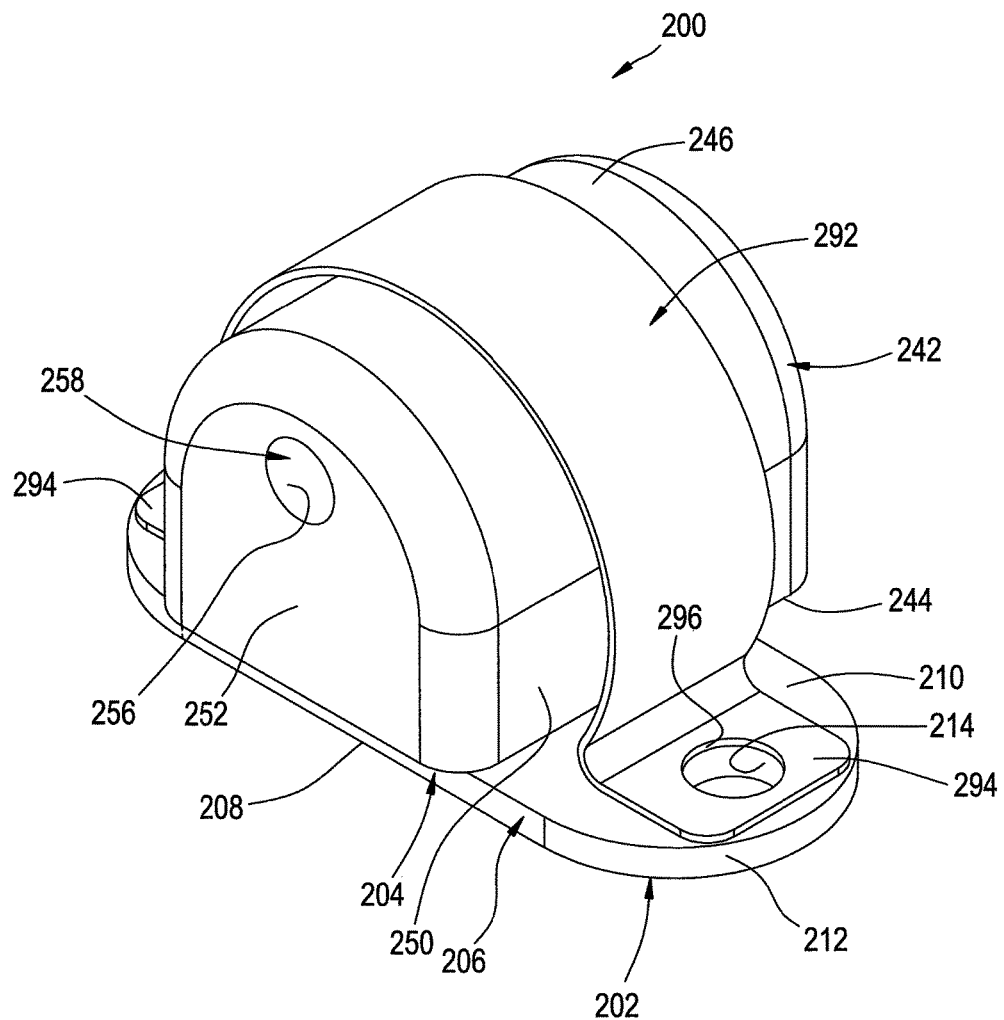
FIG. 2 is a top perspective view of one example of a mounting assembly in accordance with the subject matter of the present disclosure.
Figure 3:
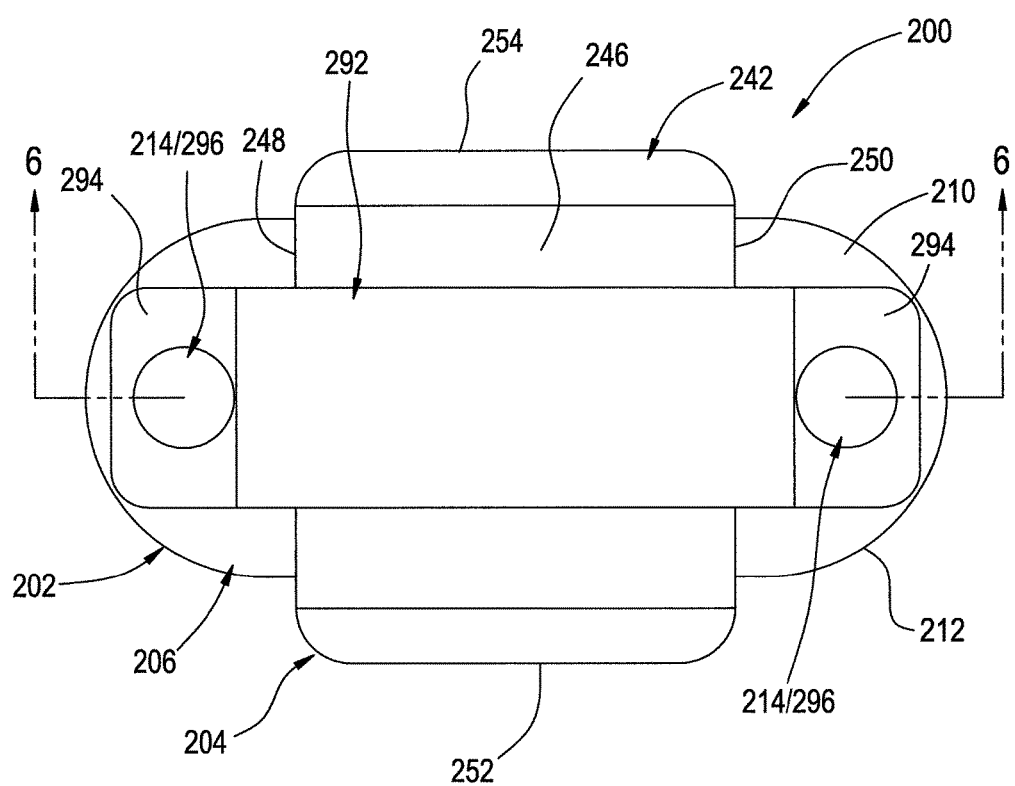
FIG. 3 is a top plan view of the mounting assembly in FIG. 2.
Figure 4:
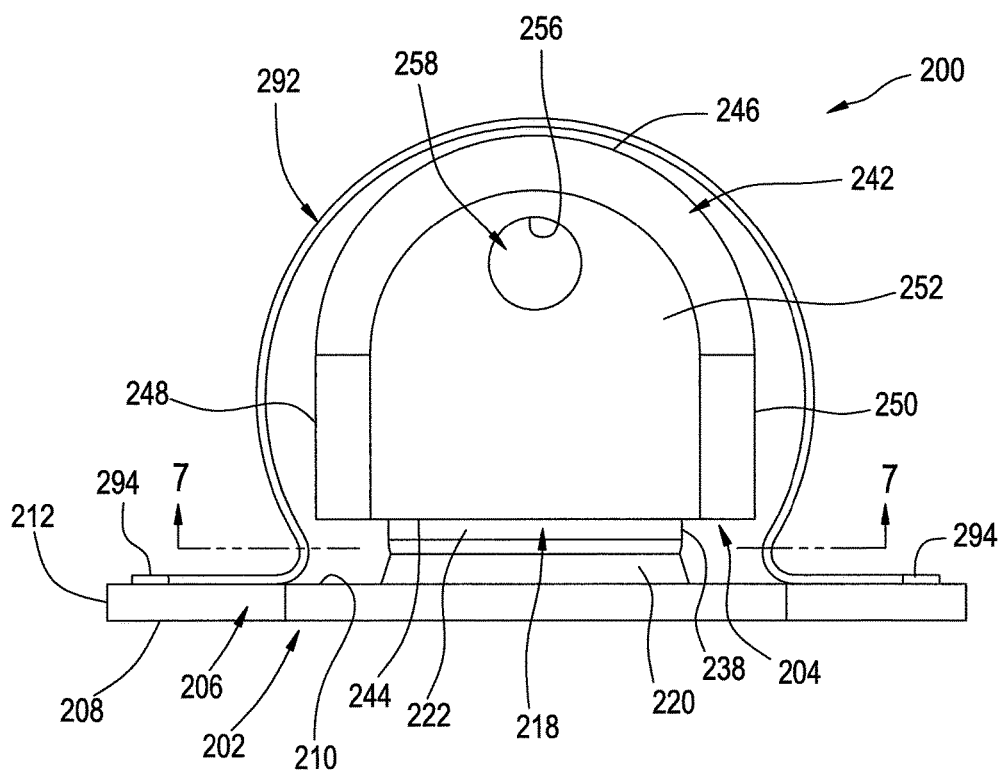
FIG. 4 is a front elevation view of the mounting assembly in FIGS. 2 and 3.
Figure 5:
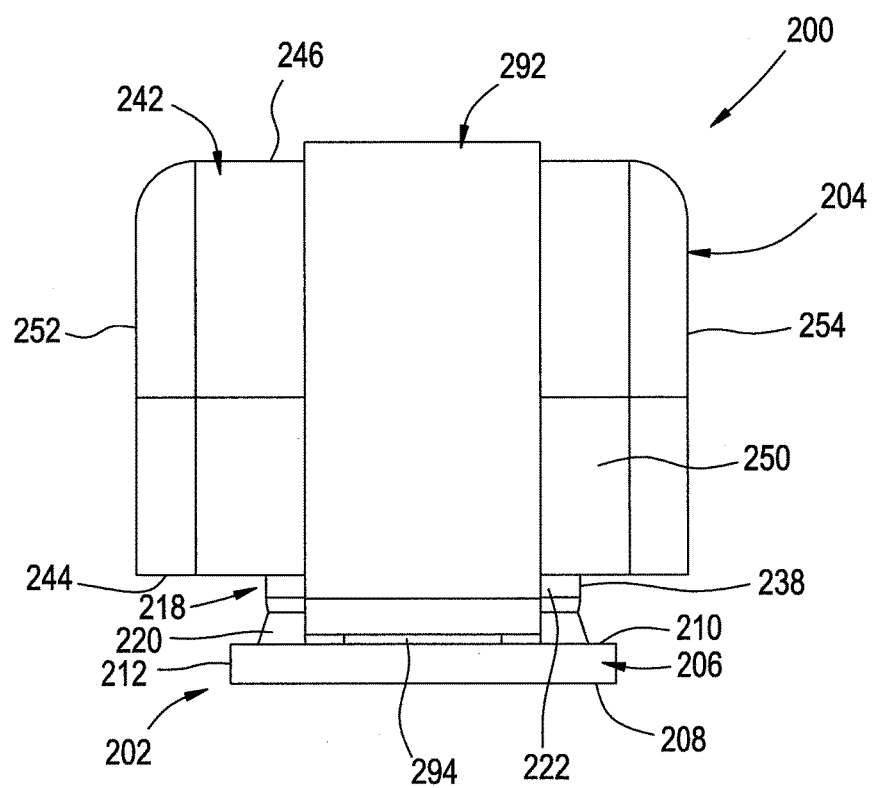
FIG. 5 is a side elevation view of the mounting assembly in FIGS. 2-4.

FIG. 1 illustrates one example of a system 100 that includes a supported structure or component 102 and a supporting structure or component 104. Such a system can also include one or more mounting assemblies in accordance with the subject matter of the present disclosure, which can include one or more biasing elements capable of exhibiting a positive stiffness and one or more biasing elements capable of exhibiting a negative stiffness that are operatively connected in parallel with the one or more positive-stiffness biasing elements. In the arrangement shown in FIG. 1, for example, system 100 includes mounting assemblies 106 that are disposed in spaced apart relation to one another along supporting structure 104 and operatively connected to supported structure 102.

A mounting assembly in accordance with the subject matter of the present disclosure can function to isolate and/or otherwise reduce the transmission of oscillations and/or other vibrations between the supported and supporting structures. In many cases, such oscillations and/or other vibrations may be attributed to non-constant outputs generated by the supported structure (e.g., dynamic outputs from internal combustion engines) and/or non-constant forces acting on the supported structure. One non-limiting example of such forces can include dynamic forces acting on a vehicle cab or body, such as from vertical accelerations due to a moving vehicle incurring road inputs (e.g., bumps, potholes).

Broadly, a mounting assembly in accordance with the subject matter of the present disclosure can isolate or otherwise reduce the transmission of oscillations, vibrations and/or other kinetic energy inputs by reducing the transmissibility (i.e., amplification or gain) of vibrations passing through the mounting assembly. A mounting assembly in accordance with the subject matter of the present disclosure can reduce the transmissibility of such kinetic energy inputs (e.g., vibrations) by reducing the natural frequency at which the system resonates. By shifting the natural frequency of the system away from certain targeted frequencies or ranges of frequencies (e.g., a vehicle axle hop frequency within a range of about 8-12 Hz and/or driveline vibrations having a frequency within a range of about 15-200 Hz), the transmissibility of vibrations at those certain targeted frequencies or ranges of frequencies can be substantially reduced.

It will be appreciated that one or more structures and/or components of system 100 can generate, be excited by and/or be otherwise operatively associated with vibratory or other kinetic energy inputs, such as are represented in FIG. 1 by arrows VBX, VBY and VBZ. It will be appreciated that arrows VBX, VBY and VBZ can correspond to vibrations or axial components of vibrations in the X, Y and Z directions, such as are represented by the corresponding lines of the coordinate system in FIG. 1. Additionally, it will be appreciated that the coordinate system has been arbitrarily assigned for convenience of discussion and that any other suitable orientation and/or alignment of reference axes could alternately be used.

In many cases, vibrational inputs may not occur exclusively in a single axial direction. Rather, vibrational inputs will often have directional components extending along two or more axial directions that together form the overall or composite direction in which the vibration and/or other kinetic energy inputs act. In many cases, however, one axial direction will be the primary or dominate direction with the other two directional components being secondary and tertiary. In such cases, a mounting assembly in accordance with the subject matter of the present disclosure can include one or more biasing elements capable of exhibiting a positive-stiffness spring rate (which are also referred to herein as positive-stiffness biasing elements) operatively associated with the primary axial direction and, optionally, one or more positive-stiffness biasing elements operatively associated with the secondary and/or tertiary axial directions. Such a mounting assembly can also include one or more biasing elements capable of exhibiting a negative-stiffness spring rate (which are also referred to herein as negative-stiffness biasing elements) operatively associated with the primary axial direction and, optionally, one or more negative-stiffness biasing elements operatively associated with the secondary and/or tertiary axial directions.

In the arrangement shown in FIG. 1, supporting structure 104 can be maintained in a substantially fixed position and supported structure 102 can generate, be excited by or be otherwise operatively associated with vibratory input. As such, supported structure can undergo oscillatory, random and/or other vibratory displacement relative to the supporting structure. For purposes of discussion, vibratory input VBY acting along the Y-axis will be adopted as the primary direction for kinetic energy input acting on supported structure 102. Vibratory input VBX acting along the X-axis and vibratory input VBZ acting along the Z-axis have been respectively adopted as the secondary and tertiary directions for kinetic energy inputs acting on the supported structure. It is to be recognized and understood, however, that such an orientation is merely exemplary and is referenced herein for solely purposes of discussion and illustration and is not intended to be limiting.

It will be appreciated that the subject matter of the present disclosure is capable of broad use in a wide variety of applications and/or environments. Non-limiting examples of such applications and/or environments can include automotive applications, heavy-duty trucking applications, rail applications, marine applications, aeronautical applications, electrical power generation and/or industrial applications. As such, non-limiting examples of supported structures or components can include electric motors, internal combustion engines, vehicle cabs or bodies, driveline components, gearboxes and mechanical systems and/or components for building structures (e.g., pumps, air handlers). Non-limiting examples of supporting structures or components can include vehicle frames, machine bases, building foundations and/or framework.

It will be appreciated that mounting assemblies 106 can be operatively connected to the supported and supporting structures in any suitable manner. As one non-limiting example, mounting assemblies 106 are shown as including a housing or mounting component 108 that can support one or more positive-biasing elements and one or more biasing elements exhibiting a negative stiffness through at least a portion of the displacement thereof. Housing 108 can be secured on or along supporting structure 104 in any suitable manner, such as by way of one or more threaded fasteners 110, for example. Additionally, as one non-limiting example, brackets or mounting components 112 can be secured on or along supported structure 102, such as by way of one or more securement devices, such as threaded fasteners 114, for example. In such cases, a shaft or threaded fastener 116 can be operatively connected between mounting components 108 and mounting components 112 such that forces and loads acting on or otherwise operatively associated with supported structure 102 are transferred or otherwise communicated to mounting assemblies 106 through mounting components 112 and threaded fasteners 114. It will be recognized and appreciated that one or more of the connections can permit pivotal or rotational movement, such as pivotal motion about shaft or threaded fastener 116, for example, as is represented in FIG. 1 by arrow ROT.

It will be appreciated that, in some cases, the one or more positive-stiffness biasing elements and/or the one or more negative-stiffness biasing elements can be disposed in abutting engagement between or otherwise directly operatively associated with the components that are attached or otherwise secured to the supported and supporting structures (e.g., mounting components 108 and 112). In other cases, however, the one or more positive-stiffness biasing elements and/or the one or more negative-stiffness biasing elements can be operatively disposed between intermediate components. In such cases, the one or more positive-stiffness biasing elements and/or the one or more negative-stiffness biasing elements together with any intermediate components can form mounting assemblies (or mounting sub-assemblies) that can be operative disposed between the components (e.g., mounting components 108 and 112) that are secured to the supported and supporting structures, such as is represented in FIG. 1 by dashed-line boxes 118, for example.

In some cases, one or more of mounting assemblies 106 can include a gas spring construction that can utilize pressurized gas. In such cases, system 100 can, optionally, include or can, optionally, be otherwise operatively associated with a pressurized gas system 120, such as may include a pressurized gas source PGS (e.g., a compressor), a pressurized gas storage device GSD (e.g., a reservoir) and/or a pressurized gas control device GCD (e.g., a valve), for example. Such a pressurized gas system, if provided, can be operatively connected with one or more of mounting assemblies 106 and/or one or more of mounting assemblies 118 in any suitable manner, such as is represented in FIG. 1 by dashed lines 122, for example. Furthermore, system 100 can, optionally, include or can, optionally, be otherwise operatively associated with a control system 124, such as may be adapted to selectively operate one or more components and/or features of pressurized gas system 120, for example. Such a control system, if provided, can be operatively connected with pressurized gas system 120, if provided, in any suitable manner, such as is represented in FIG. 1 by dashed line 126, for example.

One example of a mounting assembly in accordance with the subject matter of the present disclosure, such as may be suitable for use as one or more of mounting assemblies 106 and/or one or more of mounting assemblies 118 in FIG. 1, for example, is identified as a mounting assembly 200 in FIGS. 2-8. The mounting assembly can have a primary axis AX (FIG. 6) and can include a mounting element or base 202 that can, optionally and in some cases, function as a mounting component (e.g., housing 108) of mounting assembly 106. In other cases, mounting element or base 202 can be used as an intermediate element of mounting assembly 118.

Mounting assembly 200 can also include a mounting element or cap 204 that is supported on base 202 by way of one or more biasing elements such that the mounting element is displaceable relative to the base in at least a direction along the primary axis. It will be appreciated that the base can be constructed from any suitable combination of components, elements and/or features. As one example, base 202 can include a base wall or base wall portion 206 having a surface 208 dimensioned for securement on or along an associated structure, such as one of supported and supporting structures 102 and 104, for example. Base 202 can also include a surface 210 facing opposite surface 208 and an outer peripheral edge 212 that extends between surfaces 208 and 210. One or more holes or openings 214 can extend through base 202 and can be dimensioned to receive an associated securement device, such as one of fasteners 114, for example. Additionally, an opening or passage 216 can extend through base 202 and can be dimensioned to receive a pressurized gas fitting (not shown) and/or to otherwise permit pressurized gas transfer into and/or out of one or more internal chambers of mounting assembly 200.

Base 202 can also include an inner support wall or an inner support wall portion 218 that projects from the base wall from along surface 210 in a direction away from surface 208. In some cases, the inner support wall can be integrally formed with the base wall. In other cases, inner support wall 218 can be provided as a separate component and secured on or along the base wall in a suitable manner, such as by way of a flowed material joint 220, for example. Inner support wall 218 can include a side wall portion 222 that extends from a distal edge 224 toward an end wall portion 226 disposed in abutting engagement with surface 210 of base wall 206. Additionally, inner support wall 218 can, optionally, include a connector wall portion 228 that can project from along end wall portion 226, such as in a direction opposite side wall portion 222, for example. In some cases, connector wall portion 228, if provided, can at least partially define a pressurized gas port 230 extending through inner support wall 218 to permit pressurized gas transfer into and/or out of one or more internal chambers of mounting assembly 200. Connector wall portion 228 can, optionally, include one or more securement features, such as one or more helical threads, for example, for receiving and retaining a pressurized gas fitting or other connector (not shown). In some cases, connector wall portion 228 can extend to a distal edge 232 and can have an outer peripheral surface (not numbered) that is dimensioned for receipt within passage 216 of base wall 206.

Inner support wall 218 is shown as including an inner surface 234 that extends along side wall portion 222 and end wall portion 224 and at least partially defines a chamber 236 within mounting assembly 200. Inner support wall 218 also includes an outer surface 238 that extends along at least side wall portion 222. Outer surface 238 can be dimensioned for receipt into mounting element 204 and can be adapted to form a substantially fluid-tight seal with one or more features and/or components of the mounting element. As one example, an annular groove 240 can extend into side wall portion 222 of inner support wall 218 from along outer surface 238 and can be dimensioned to receive and retain one or more sealing elements 241 operative to form a substantially fluid-tight seal between the two mounting elements. It will be appreciated, however, that other configurations and/or arrangements could alternately be used.

Mounting element 204 is shown as being supported on base 202 and can include an element body 242 dimensioned for operative connection to an associated structure, such as one of supported and supporting structures 102 and 104, for example. Element body 242 can be of any suitable size, shape, configuration and/or arrangement, and can be formed from any suitable material or combination of materials, such as one or more of a metal material (e.g., aluminum, steel) and/or one or more polymeric materials, such as one or more thermoplastic materials. As non-limiting examples, suitable thermoplastic materials can include glass or other fiber-reinforced polypropylene, glass or other fiber-reinforced polyamide, as well as high-strength (e.g., unfilled) polyamide, polyester, polyethylene, polypropylene or other polyether-based materials, or any combination thereof.

Element body 242 of mounting element 204 is shown as having opposing end surfaces 244 and 246. Element body 242 also includes an outer periphery extending between the opposing end surfaces that includes one or more outer side surfaces or surface portions. It will be appreciated that the outer periphery can be of any suitable shape and/or configuration, such as including side surface portions 248, 250, 252 and 254, for example. Additionally, element body 242 can include any suitable number of one or more features and/or elements for securement to the opposite structure from that to which base 202 is secured. As one example, element body 242 can include a passage surface 256 that at least partially defines an opening or mounting passage 258 extending through the element body and can be dimensioned to receive one or more securement devices, such as shaft or threaded fastener 116 in FIG. 1, for example.

Element body 242 can also include one or more surfaces or surface portions dimensioned to at least partially define a recess (not numbered) extending thereinto from along end surface 244. As one example, element body 242 can include an inner side surface portion 260, and inner shoulder surface portion 262 and an inner end surface portion 264 that together at least partially define the recess within element body 242. Mounting element 204 can, optionally, include an inner sleeve element 266 that is at least partially received within the recess in element body 242. Inner sleeve element 266 can include a side wall portion 268 and an end wall portion 270 that extends radially inward from along the side wall portion. End wall portion 270 of inner sleeve element 266 can, optionally, terminate at an inside edge 272 that can at least partially define an opening (not numbered) along the end wall portion of the inner sleeve element.

Figure 6:
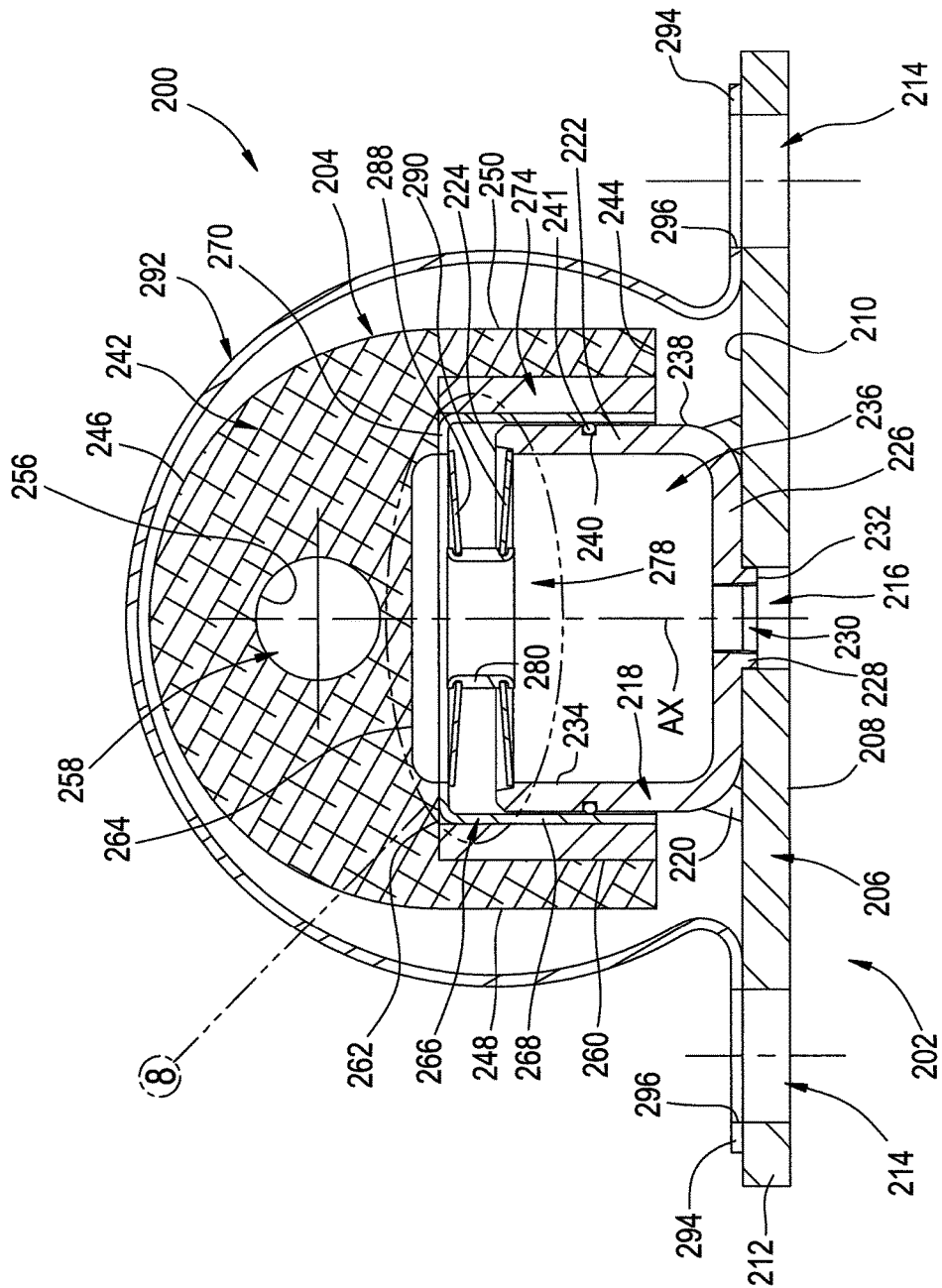
FIG. 6 is a cross-sectional side view of the mounting assembly in FIGS. 2-5 taken from along line 6-6 in FIG. 3.
Figure 7:
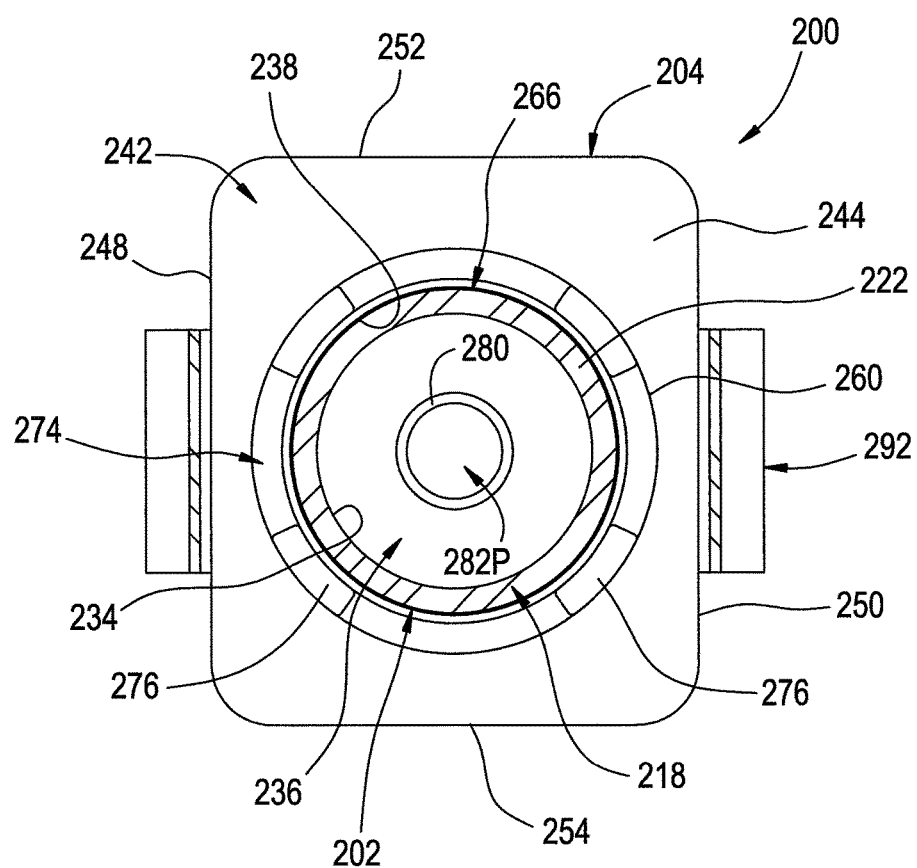
FIG. 7 is a cross-sectional bottom view of the mounting assembly in FIGS. 2-6 taken from along line 7-7 in FIG. 4.

In a preferred arrangement, inner sleeve element 266 is received within the recess of element body 242 and secured thereto in a substantially fluid-tight manner, such as by way of a flowed-material joint (not shown) along the interface between inner shoulder surface portion 262 and end wall portion 270 of inner sleeve element 266, for example. Additionally, side wall portion 268 of the inner sleeve element can have an inside surface (not numbered) that is dimensioned for sliding engagement with outer surface 238 and one or more sealing elements 241 disposed therebetween. In this manner, mounting element 204 is displaceable relative to base 202 in a direction along primary axis AX (FIG. 6).

As discussed above, mounting assemblies 106, 118 and 200 can be subjected to vibratory inputs that act in a direction other than directly along axis AX. In some cases, the mounting element of mounting assembly can be adapted to accommodate such vibratory inputs and/or non-axial deflections. It will be appreciated that such accommodations can be achieved in any suitable manner and/or through the use of any suitable combination of one or more additional features and/or elements. For example, mounting element 204 of mounting assembly 202 can, optionally, include one or more elastomeric elements disposed between element body 242 and inner sleeve element 266 to permit the element body and side wall portion of the inner sleeve element to move relative to one another. In some cases, the one or more elastomeric elements can take the form of an annular sleeve 274 that extends from inner shoulder surface portion 262 toward end surface 244 of the element body. In such cases, the elastomeric annular sleeve can be fixedly attached between element body 242 and inner sleeve element 266, such as by way of a flowed-material joint and/or a vulcanized connection, for example. Additionally, in such cases, the flowed-material joint and/or vulcanized connection can form a substantially fluid-tight interface between the element body and the inner sleeve element. In some cases, the annular sleeve can include one or more recesses or voids 276 extending into the annular sleeve from along end surface 244. In still other cases, a plurality of elastomeric elements could be separately provided and secured in circumferentially-spaced relation to one another between the element body and the inner sleeve element.

Regardless of the type, kind and/or construction of the one or more elastomeric elements (e.g., annular sleeve 274), a substantially fluid-tight connection is preferably formed between base 202 and mounting element 204 such that chamber 236 can receive and retain a quantity of pressurized gas at a gas pressure level greater than an associated external or ambient (e.g., atmospheric) pressure for an extended period of time (e.g., days, weeks, months or years). In such case, the pressurized gas within chamber 236 can cause mounting assembly 200 to function as a pressurized gas biasing element (e.g., a gas spring) having a positive stiffness. It will be appreciated that, in some cases, the quantity and/or pressure of gas contained within the spring chamber can be increased and/or decreased to adjust the initial spring force and/or spring rate of the biasing element. It will be appreciated, that pressurized gas can be transferred into and/or out of the spring chamber in any suitable manner, such as by way of pressurized gas system 120 and connections 122 in FIG. 1, for example.

As discussed above, mounting assemblies in accordance with the subject matter of the present disclosure include one or more biasing elements capable of exhibiting a positive stiffness and one or more biasing elements capable of exhibiting a negative stiffness. It will be appreciated that biasing elements capable of exhibiting a negative stiffness may, in some cases, have an overall stiffness profile that includes both positive and negative stiffness areas. As such, it is to be recognized and understood that suitable biasing elements can include an overall stiffness profile for which negative stiffness is only a portion. One example of a type and kind of biasing element that exhibits positive stiffness characteristics through a first portion of the deflection curve and exhibits negative stiffness characteristics through a second portion of the deflection curve is a conical disc spring (e.g., Belleville-style washer). It will be appreciated, however, that one or more biasing elements of any other suitable type, kind, construction and/or configuration could alternately be used.

It will be appreciated that the one or more positive-stiffness biasing elements (e.g., gas springs) and the one or more negative-stiffness biasing elements can be formed in any suitable manner and from any suitable material or combination of materials. Additionally, the combination of biasing elements can include any number of one or more negative stiffness elements in operative combination with any number of one or more positive stiffness elements.

Mounting assembly 200 can also include a negative-stiffness biasing element assembly 278 that is operatively connected between base 202 and mounting element 204 in parallel with the positive-stiffness gas spring formed by chamber 236. It will be appreciated that negative-stiffness biasing element assembly 278 can be of any suitable construction and/or arrangement and can include any suitable combination of components and biasing elements. For example, biasing element assembly 278 is shown as including a connecting ring 280 that extends axially between opposing ring edges (not numbered) has an inner surface 282 and an outer surface 284. Additionally, connecting ring 280 can include two or more annular grooves 286 that extend into the connecting ring from along outer surface 284. In the arrangement shown in FIGS. 6 and 8, annular grooves 286 are disposed in axially-spaced relation to one another and are dimensioned to receivingly engage one or more features of the negative-stiffness biasing elements.

Figure 8:
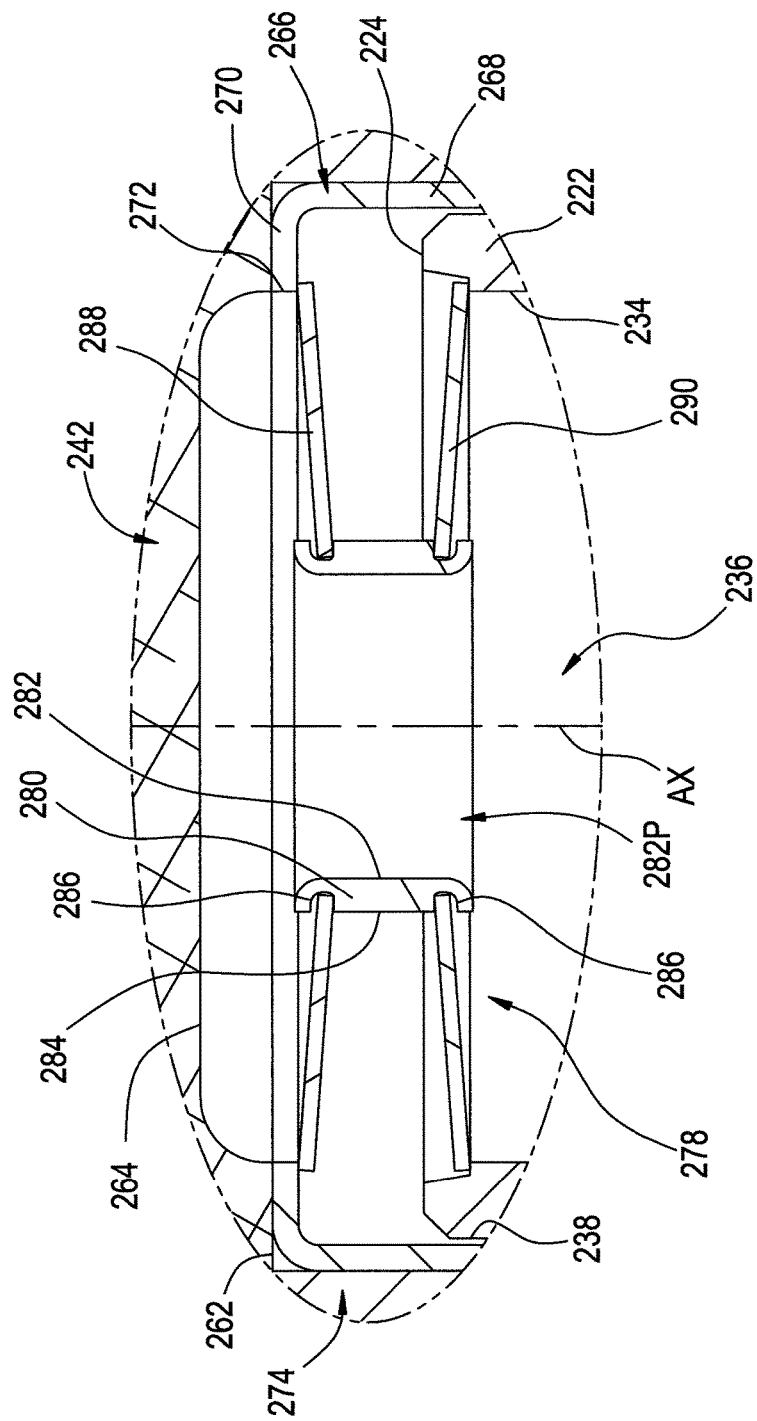
FIG. 8 is an enlarged view of the portion of the mounting assembly identified as Detail 8 in FIG. 6.

As indicated above, one example of suitable biasing elements that are capable of exhibiting a negative stiffness are shown in FIGS. 6 and 8 as biasing elements 288 and 290, which are in the form of conical disc springs. Biasing elements 288 and 290 include an inner edge (not numbered) that at least partially forms an opening through the biasing elements and an outer edge that at least partially forms the outer periphery of the biasing elements. A spring wall extends between the inner edge and the outer edge. The inner edge and the outer edge are axially offset from one another such that the spring wall extends at an acute angle relative to axis AX giving each of the biasing elements a frustoconical overall shape.

Biasing element assembly 278 includes biasing elements 288 and 290 oriented relative to one another such that the inner edges thereof are facing toward one another and such that the outer edges are facing away from one another. Additionally, biasing elements 288 and 290 are received along connecting ring 280 with the inner edges of the biasing elements at least partially received within grooves 286 such that the biasing elements are supported in spaced-apart relation to one another. The outer edge of biasing element 288 is disposed in abutting engagement adjacent inside edge 272 of end wall portion 270. The outer edge of biasing element 290 is received in a recess (not numbered) formed along distal edge 224 of side wall portion 222 of inner support wall 218. It will be appreciated, however, that other configurations and/or arrangements could alternately be used.

It will be appreciated that biasing element assembly 278 is operatively connected between base 202 and mounting element 204 in parallel with the positive-stiffness gas spring formed by chamber 236. As such, inner surface 282 of connector ring 280 can act as a passage 282P that permits pressurized gas transfer through the biasing element assembly. In this manner, negative-stiffness biasing element assembly 278 and the positive-stiffness gas spring can function in parallel with one another to provide a reduced overall spring rate of mounting assembly 200. To maintain mounting assembly 200 in an assembled condition prior to installation and/or to substantially inhibit inadvertent disassociation of mounting element 204 from base 202 during use, a restraining or limiting strap 292 can extend across end surface 246 and along side surface portions 248 and 250. Additionally, limiting strap 292 can include end portions 294 dimensioned to extend along base wall 206 for securement therealong in a suitable manner, such as by way of fasteners 110 (FIG. 1) extending through holes 296 in the end portions, for example.

Figure 9:
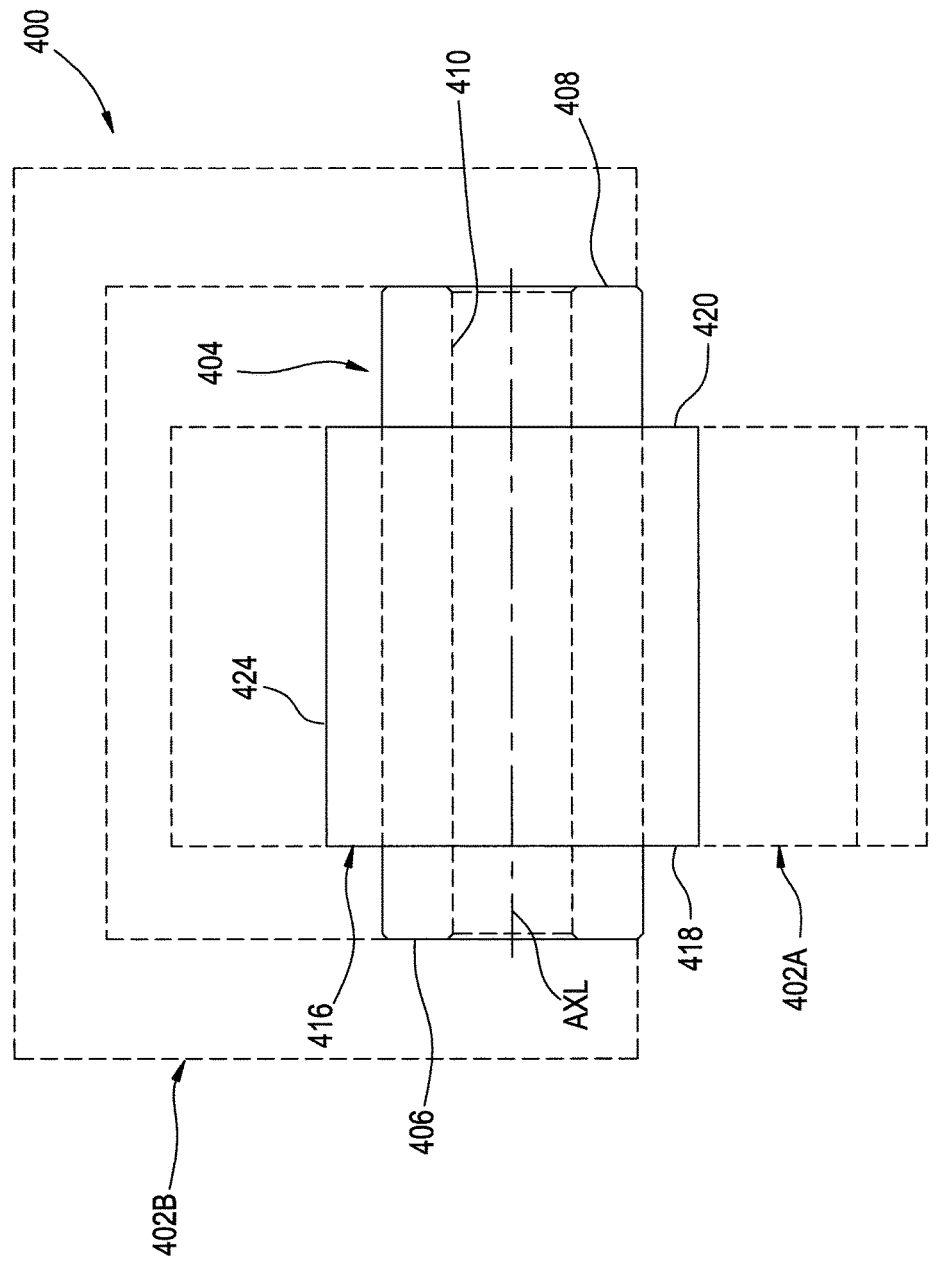
FIG. 9 is a front elevation view of another example of a mounting assembly in accordance with the subject matter of the present disclosure.
Figure 10:
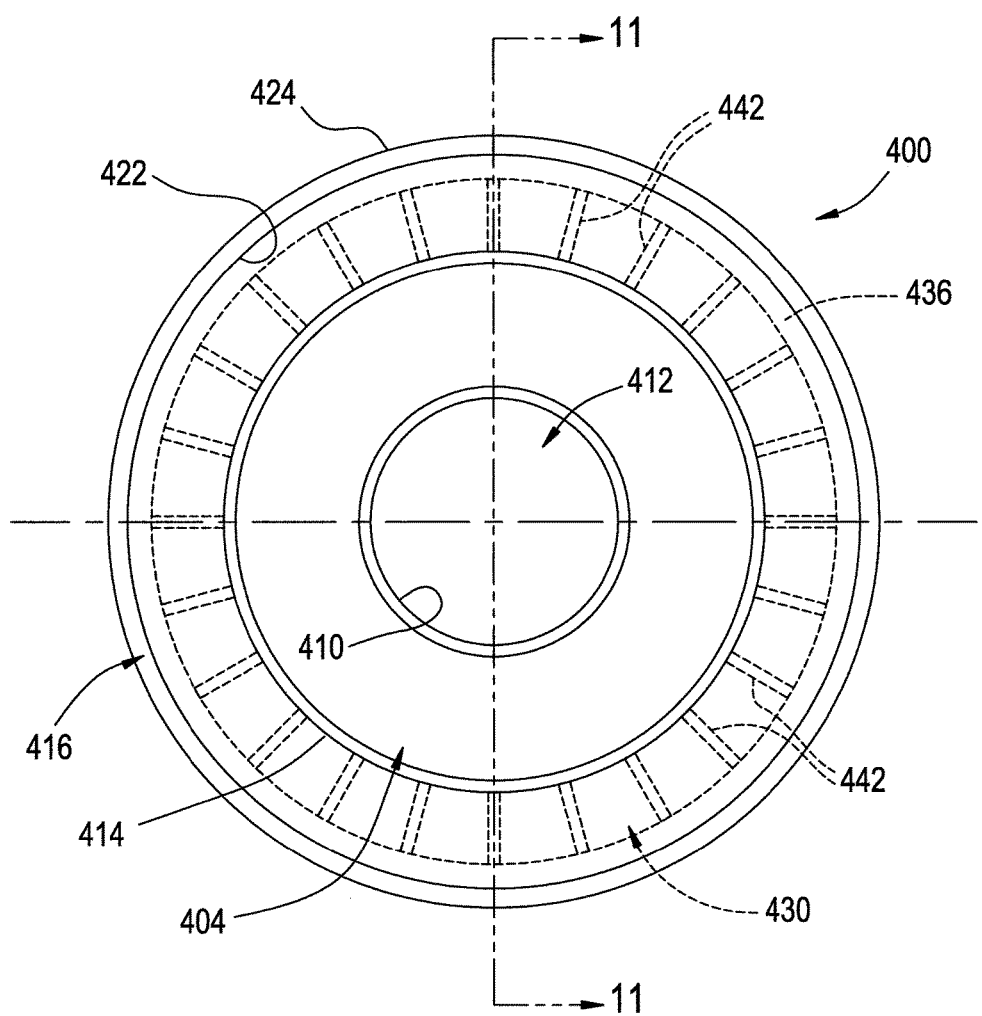
FIG. 10 is a side elevation view of the mounting assembly in FIG. 9.

Another example of a mounting assembly in accordance with the subject matter of the present disclosure, such as may be suitable for use as one or more of mounting assemblies 106 and/or one or more of mounting assemblies 118 in FIG. 1, for example, is identified as a mounting assembly 400 in FIGS. 9-12. Mounting assembly 400 differs from mounting assemblies 106 and 200 described above in that mounting assembly 400 is configured for securement within a passage, cavity or other suitable mounting feature provided on or along the associated supported structure (e.g., supported structure 102) or the associated supporting structure (e.g., supporting structure 104). Alternately, mounting assembly can be secured in a separate housing that is securable on or along one of the supported and supporting structures, such as is represented in FIG. 9 by dashed lines 402A and 402B which can, for example, respectively represent housing 108 and cap 112 or other similar structural elements.

The mounting assembly can have a longitudinal axis AXL (FIG. 11) and can include an inner mounting element 404 that extends longitudinally between opposing end surfaces 406 and 408. Inner mounting element 404 can also include an inner surface 410 that at least partially defines a mounting passage 412 extending through the inner mounting element and which can be dimensioned to receive an associated fastener or connector, such as fastener 116 (FIG. 1), for example. Inner mounting element 404 can also include an outer surface 414 extending between end surfaces 406 and 408.

Mounting assembly 400 can also include an outer mounting element 416 that extends longitudinally between opposing end edges 418 and 420. The outer mounting element includes an inside surface 422 and an outside surface 424. In the arrangement shown in FIGS. 9-12, inner mounting element 404 is received within outer mounting element 416 such that the inner and outer mounting elements are at least approximately concentric with one another. Additionally, the inner and outer mounting elements are coextensive with one another along longitudinal axis AXL such that at least a portion of the inner and outer mounting elements axially overlap one another.

Figure 11:
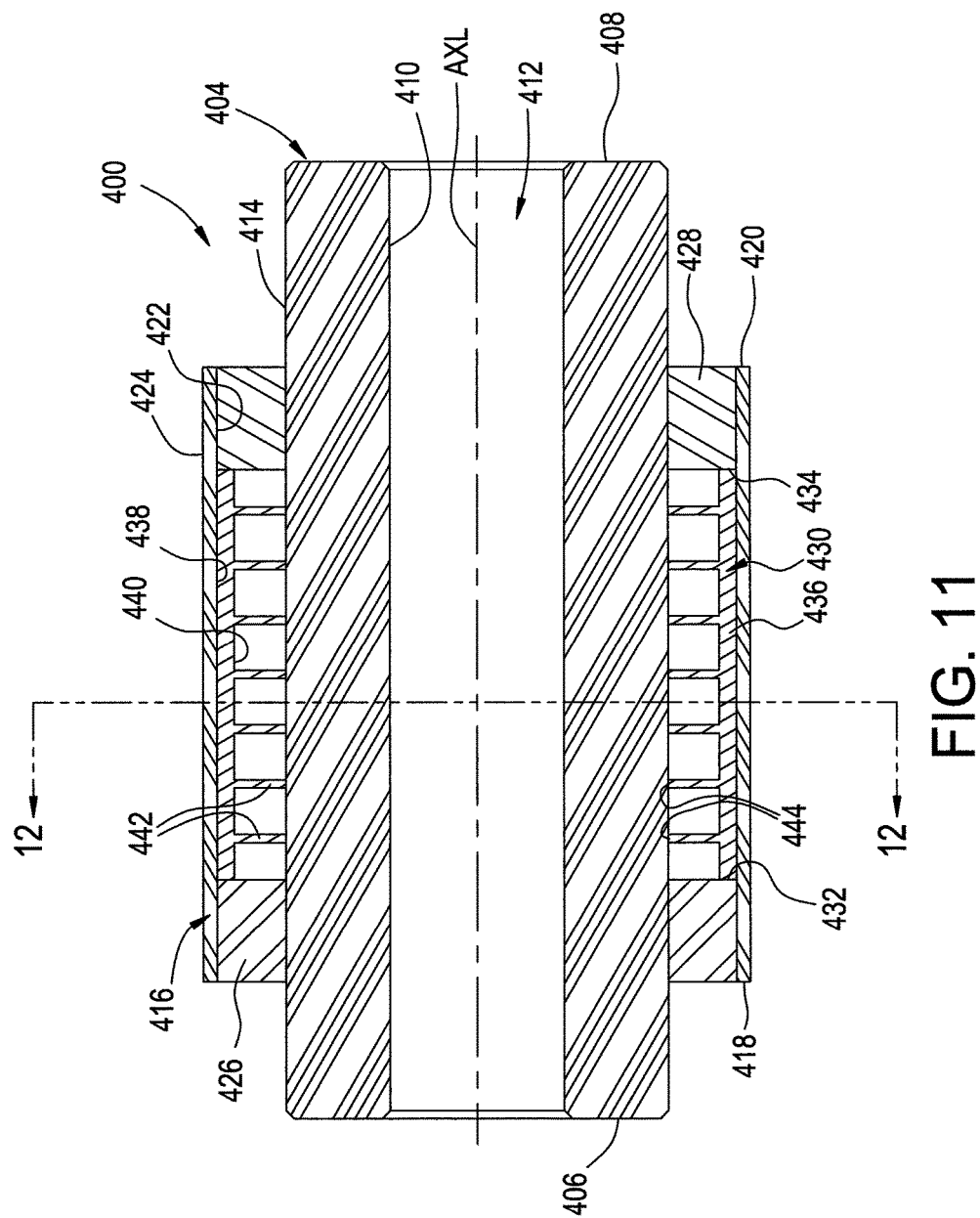
FIG. 11 is a cross-sectional view of the mounting assembly in FIGS. 9 and 10 taken from along line 11-11 in FIG. 10.

Mounting assembly 400 can further include one or more positive-stiffness biasing elements that are operatively disposed between the inner and outer mounting elements. In the arrangement shown in FIGS. 9-12, for example, mounting assembly 400 includes positive-stiffness biasing elements 426 and 428 that are disposed in spaced relation to one another adjacent end edges 418 and 420 of outer mounting element 416 such that a cavity (not numbered) is formed by the positive-stiffness biasing elements between the inner and outer mounting elements. In some cases, biasing elements 426 and 428 can be spaced inwardly from end surfaces 406 and 408 of inner mounting element 404, such as is shown in FIG. 11, for example.

Mounting assembly 400 can also include one or more biasing elements capable of exhibiting negative stiffness that are operatively disposed between inner mounting element 404 and outer mounting element 416 in parallel with positive-stiffness biasing elements 426 and 428. As illustrated in FIGS. 10-13, mounting assembly 400 is shown as including a negative-stiffness biasing element 430 that extends longitudinally between opposing end edges 432 and 434. Biasing element 430 includes an outer shell wall 436 having an outer surface 438 and an inner surface 440. Additionally, a plurality of beam elements 442 are distributed in spaced relation to one another longitudinally along inner surface 440. The plurality of beam elements are oriented in a radial direction and can, in some cases, be aligned in rows of beam elements that are distributed in circumferentially spaced relation to one another about the inner surface.

Outer surface 438 of outer shell wall 436 can be dimensioned to be received within outer mounting element 416 and to abuttingly engage inside surface 422 thereof. Additionally, beam elements 442 extend from outer shell wall 436 to a distal end surface 444 that is configured to abuttingly engage outside surface 414 of inner mounting element 404. As such, in an assembled condition, negative-stiffness biasing element 430 can be disposed longitudinally between positive-stiffness biasing elements 426 and 428 and can extend radially in abutting engagement between inside surface 422 of outer mounting element 416 and outside surface 414 of inner mounting element 404.

In some cases, a quantity of filler material (not shown) can be disposed within the cavity formed by the positive-stiffness biasing elements between the inner and outer mounting elements. The filler material can surround beam elements 442 and can, in some cases, flow or otherwise undergo displacement within the cavity as mounting assembly 400 experiences oscillations, vibrations and/or other kinetic energy inputs during use. It will be appreciated that any suitable material or combination of materials of any suitable type, kind and/or constitution could be used, such as a viscous liquid or gel-like material, for example.

Figure 11A:
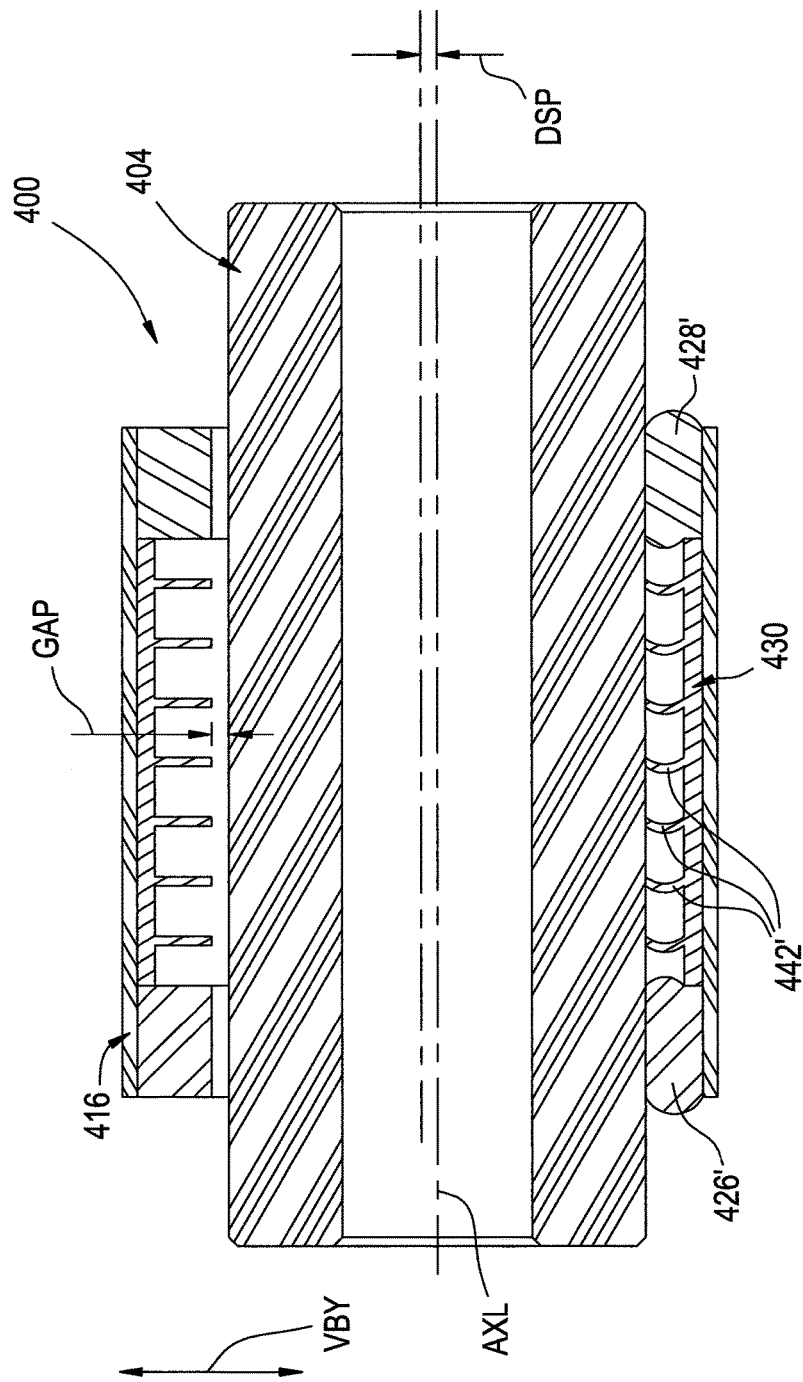
FIG. 11A is the cross-sectional view of FIG. 11 with the mounting assembly shown in a deflected condition.
Figure 12:
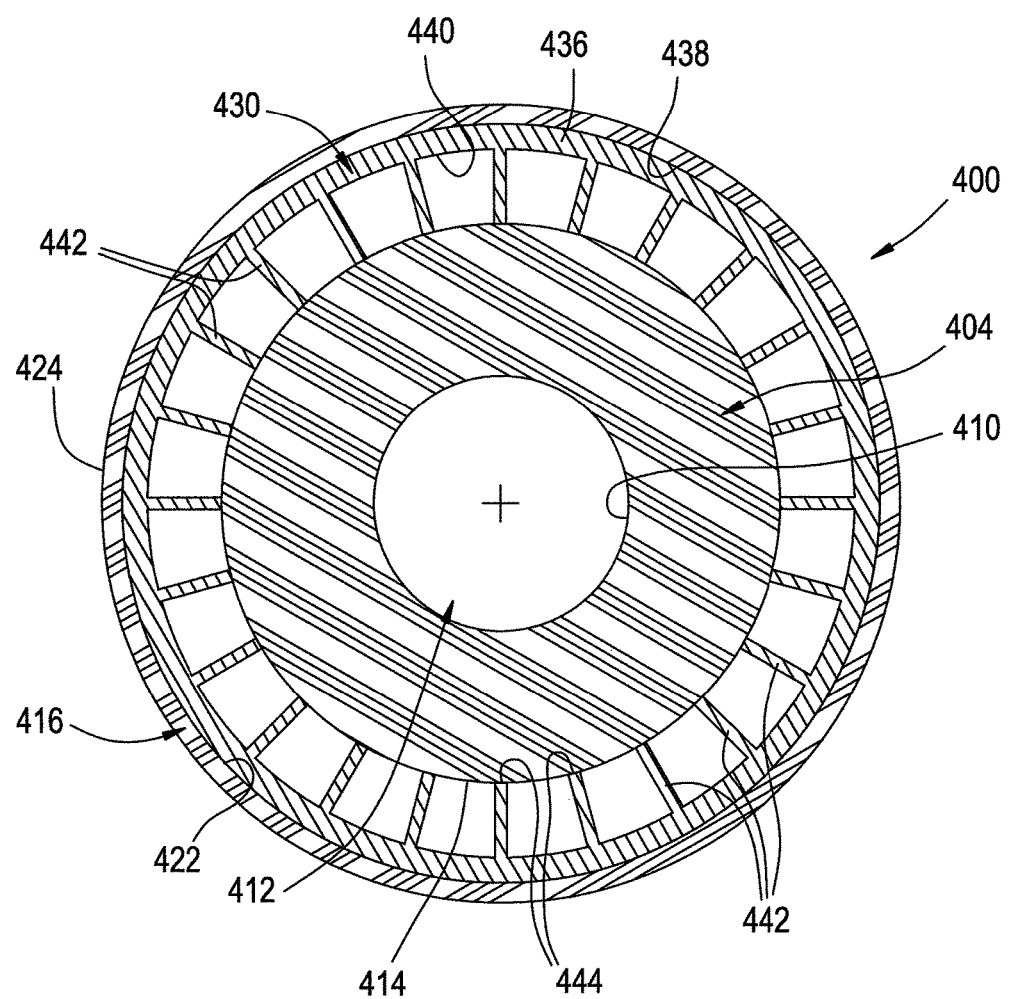
FIG. 12 is a cross-sectional side view of the mounting assembly in FIGS. 9-11 taken from along line 12-12 in FIG. 11.
Figure 12A:
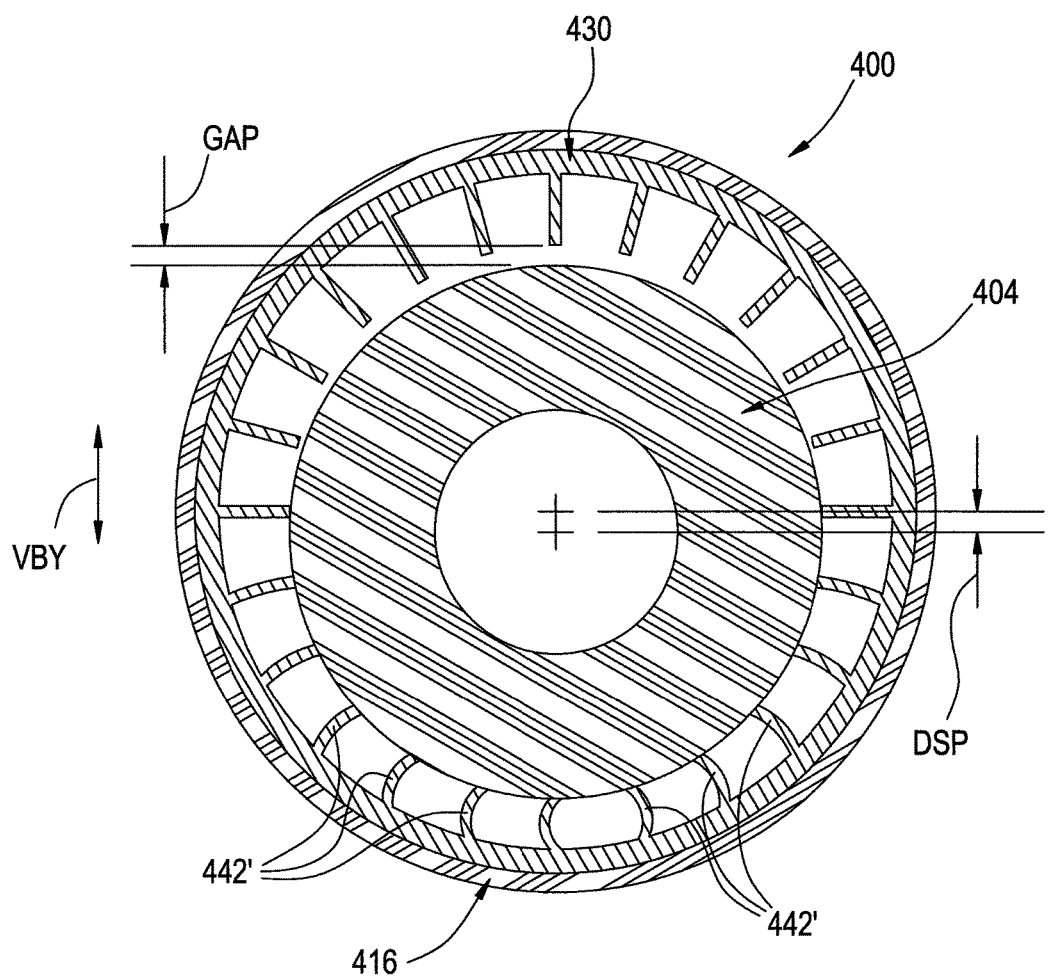
FIG. 12A is the cross-sectional view of FIG. 12 with the mounting assembly shown in a deflected condition.
Figure 13:
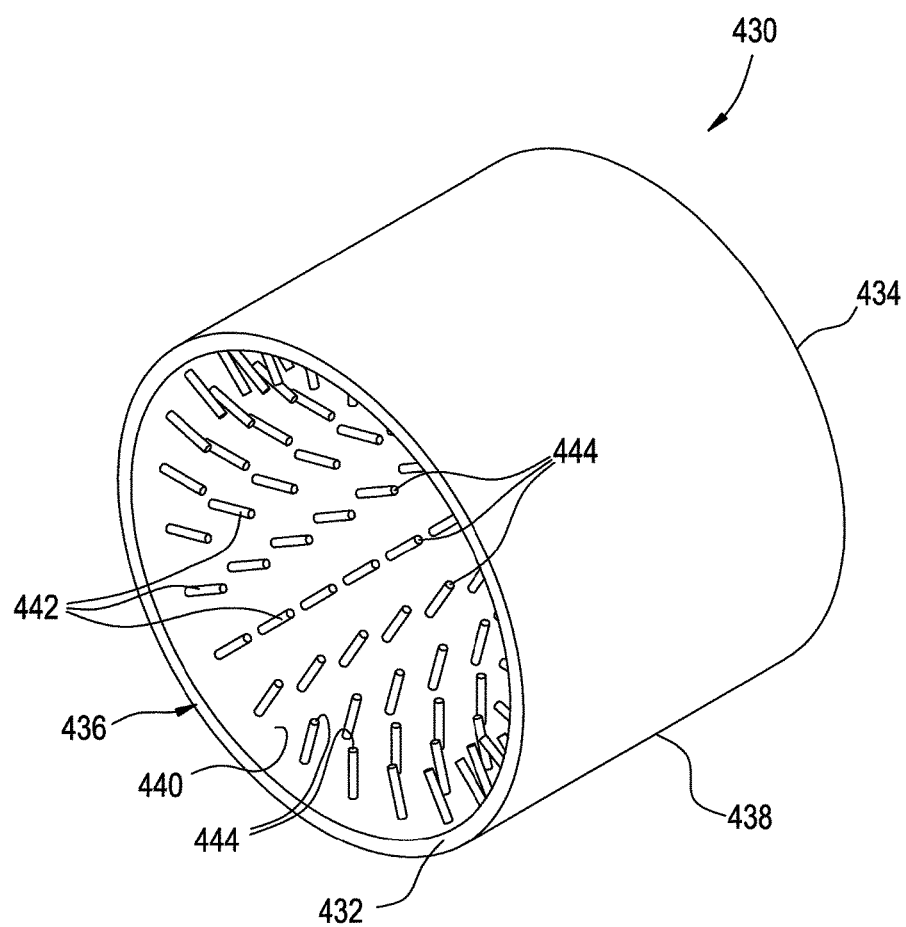
FIG. 13 top perspective view of one example of a negative stiffness element in accordance with the subject matter of the present disclosure as shown in FIGS. 9-12.

Upon experiencing vibrations and/or other kinetic energy inputs acting in a radial direction (i.e., a direction transverse to axis AXL), one or more beam elements are compressed or otherwise deflected, and under such conditions can exhibit a negative stiffness. Under use in parallel with one or more positive-stiffness biasing elements, such negative-stiffness can offset the positive stiffness of other biasing elements. FIGS. 11A and 12A illustrate mounting assembly 400 in a deflected condition. More specifically, inner mounting element 404 is shown as being displaced in the direction of arrow VBY, as is represented by reference dimension DSP in FIGS. 11A and 12A. Under such conditions, the positive-stiffness biasing elements can undergo elastomeric compression to provide a positive spring rate and corresponding spring force, as is represented in FIG. 11A by biasing elements 426' and 428'. Additionally, under such conditions, one or more of the beam elements can undergo elastomeric buckling or other non-plastic (i.e., non-permanent) deflection in a manner operative as a negative-stiffness biasing element in accordance with the subject matter of the present disclosure, as is represented in FIGS. 11A and 12A by beam elements 442'. In some cases, distal end surfaces 444 of some of beam elements 442 may become dissociated with outside surface 414 of inner mounting element 404, such as is represented in FIGS. 11A and 12A by reference dimension GAP, for example.

It will be recognized that the natural frequency of an assembly, system or device is generally understood to be a function of spring rate, using one or more biasing elements having a negative stiffness in combination with one or more biasing elements having a positive stiffness will reduce the effective spring rate of the resulting assembly, system or device. In such case, a corresponding change (e.g., reduction) in the natural frequency of an assembly, system or device will be achieved in accordance with the subject matter of the present disclosure.

Optionally, one or more of the mounting assemblies described above (e.g., mounting assemblies 106, 118, 200 and/or 400) can include one or more damping elements (not shown) operative to dissipate kinetic energy acting on the mounting assembly. It will be appreciated that the one or more damping elements, if included, can be of any suitable type, kind, construction and/or configuration. For example, the one or more damping elements could include any one or more of constructions such as piston/cylinder constructions that utilize hydraulic fluid, pressurized gas and/or other fluids as the working medium. As another example of a suitable construction, one or more flexible walls that at least partially define two or more fluid chambers and permit transfer of liquid and/or pressurized gas as a damping element. As a further example, one or more electromagnetic damping elements could be used.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas", if used herein, can broadly refer to any gaseous or vaporous fluid. Most commonly, air is used as the working medium of devices, such as those described herein. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A mounting assembly dimensioned for operative securement between an associated supporting component and an associated supported component, said mounting assembly comprising:
 a first mounting element and a second mounting element displaceable in at least one direction relative to said first mounting element;
 at least one positive-stiffness biasing element operatively disposed between said first and second mounting elements and exhibiting a positive-stiffness spring rate, said at least one positive-stiffness biasing element including a gas spring with at least one of said first mounting element and said second mounting element at least partially defining a gas spring chamber disposed in fluid communication between said first and second mounting elements; and,
 at least one negative-stiffness biasing element operatively disposed between said first and second mounting elements and exhibiting a negative-stiffness spring rate, said at least one negative-stiffness biasing element including at least one conical disc spring and being operatively disposed in parallel with said at least one positive-stiffness biasing element such that a combined spring rate of said at least one positive-stiffness biasing element and said at least one negative-stiffness biasing element is less than said positive-stiffness spring rate of said at least one positive-stiffness biasing element alone.

2. A mounting assembly according to claim 1 further comprising at least one sealing element disposed between said first and second mounting elements and operative to form a substantially fluid-tight seal therebetween.

3. A mounting assembly according to claim 1 further comprising an elastomeric element operatively disposed between said first and second mounting elements and operative to permit relative displacement therebetween.

4. A mounting assembly according to claim 1, wherein said at least one negative-stiffness biasing element has an overall stiffness profile that includes both positive-stiffness spring rate and negative-stiffness spring rate areas.

5. A mounting assembly according to claim 1, wherein said at least one negative-stiffness biasing element includes a plurality of negative-stiffness biasing elements.

6. A mounting assembly according to claim 1 wherein said negative-stiffness biasing element is a first negative-stiffness biasing element, said mounting assembly further comprising a negative-stiffness biasing element assembly including a connecting ring, said first negative-stiffness biasing element disposed between said connecting ring and one of said first and second mounting elements, and a second negative-stiffness biasing element disposed between said connecting ring and the other of said first and second mounting elements.

7. A mounting assembly according to claim 1, wherein said at least one negative-stiffness biasing element is operatively disposed in parallel with said at least one positive-stiffness biasing element such that said mounting assembly exhibits a natural frequency that is less than a natural frequency of a mounting assembly having said at least one positive-stiffness biasing element without said at least one negative-stiffness biasing element.

8. A mounting assembly according to claim 1 further comprising a first mounting component dimensioned for direct securement to one of the associated supporting component and the associated supported component, said first mounting component dimensioned to at least partially receive and operatively support said first mounting element.

9. A mounting assembly according to any one of claim 8 further comprising a second mounting component dimensioned for direct securement to the other of the associated supporting component and the associated supported component, said second mounting component dimensioned to at least partially receive and operatively support said second mounting element.

10. A mounting assembly according to claim 1, wherein said first mounting element is a mounting component dimensioned for direct securement to one of the associated supporting component and the associated supported component.

11. A mounting assembly according to claim 10, wherein said second mounting element is a mounting component dimensioned for direct securement to the other of the associated supporting component and the associated supported component.

12. A mounting assembly dimensioned for operative securement between an associated supporting component and an associated supported component, said mounting assembly comprising:
a first mounting element and a second mounting element displaceable in at least one direction relative to said first mounting element;
at least one positive-stiffness biasing element operatively disposed between said first and second mounting elements and exhibiting a positive-stiffness spring rate; and,
a negative-stiffness biasing element assembly operatively disposed between said first and second mounting elements and exhibiting a negative-stiffness spring rate, said negative-stiffness biasing element assembly including a connecting ring, a first negative-stiffness biasing element disposed between said connecting ring and one of said first and second mounting elements, and a second negative-stiffness biasing element disposed between said connecting ring and the other of said first and second mounting elements with at least one of said first and second negative-stiffness biasing elements operatively disposed in parallel with said at least one positive-stiffness biasing element such that said mounting assembly exhibits a natural frequency that is less than a natural frequency of a mounting assembly having said at least one positive-stiffness biasing element without said first and second negative-stiffness biasing elements.

13. A mounting assembly according to claim 12, wherein said at least one positive-stiffness biasing element includes at least one of a gas spring and an elastomeric spring element operatively between said first and second mounting elements.

14. A mounting assembly according to claim 13, wherein said at least one positive-stiffness biasing element is said gas spring, and at least one of said first mounting element and said second mounting element at least partially defines a gas spring chamber disposed in fluid communication between said first and second mounting elements.

15. A mounting assembly according to claim 14 further comprising at least one sealing element disposed between said first and second mounting elements and operative to form a substantially fluid-tight seal therebetween.

16. A mounting assembly according to claim 12, wherein at least one of said first and second negative-stiffness biasing elements has an overall stiffness profile that includes both positive-stiffness spring rate and negative-stiffness spring rate areas.

17. A mounting assembly dimensioned for operative securement between an associated supporting component and an associated supported component, said mounting assembly comprising:
a first mounting element and a second mounting element displaceable in at least one direction relative to said first mounting element;
a restraining strap operatively connected between said first and second mounting elements;
at least one positive-stiffness biasing element operatively disposed between said first and second mounting elements and exhibiting a positive-stiffness spring rate; and,
at least one negative-stiffness biasing element operatively disposed between said first and second mounting elements and exhibiting a negative-stiffness spring rate, said at least one negative-stiffness biasing element operatively disposed in parallel with said at least one positive-stiffness biasing element such that a combined spring rate of said at least one positive-stiffness biasing element and said at least one negative-stiffness biasing element is less than said positive-stiffness spring rate of said at least one positive-stiffness biasing element alone.

18. A mounting assembly according to claim 17, wherein said at least one negative-stiffness biasing element has an overall stiffness profile that includes both positive-stiffness spring rate and negative-stiffness spring rate areas.

\* \* \* \* \*